Oct. 12, 1965    J. H. B. GEORGE ET AL    3,211,521
PROCESS FOR REMOVING IRON FROM ACIDIC
ALUMINUM-CONTAINING SOLUTIONS
Filed July 30, 1962
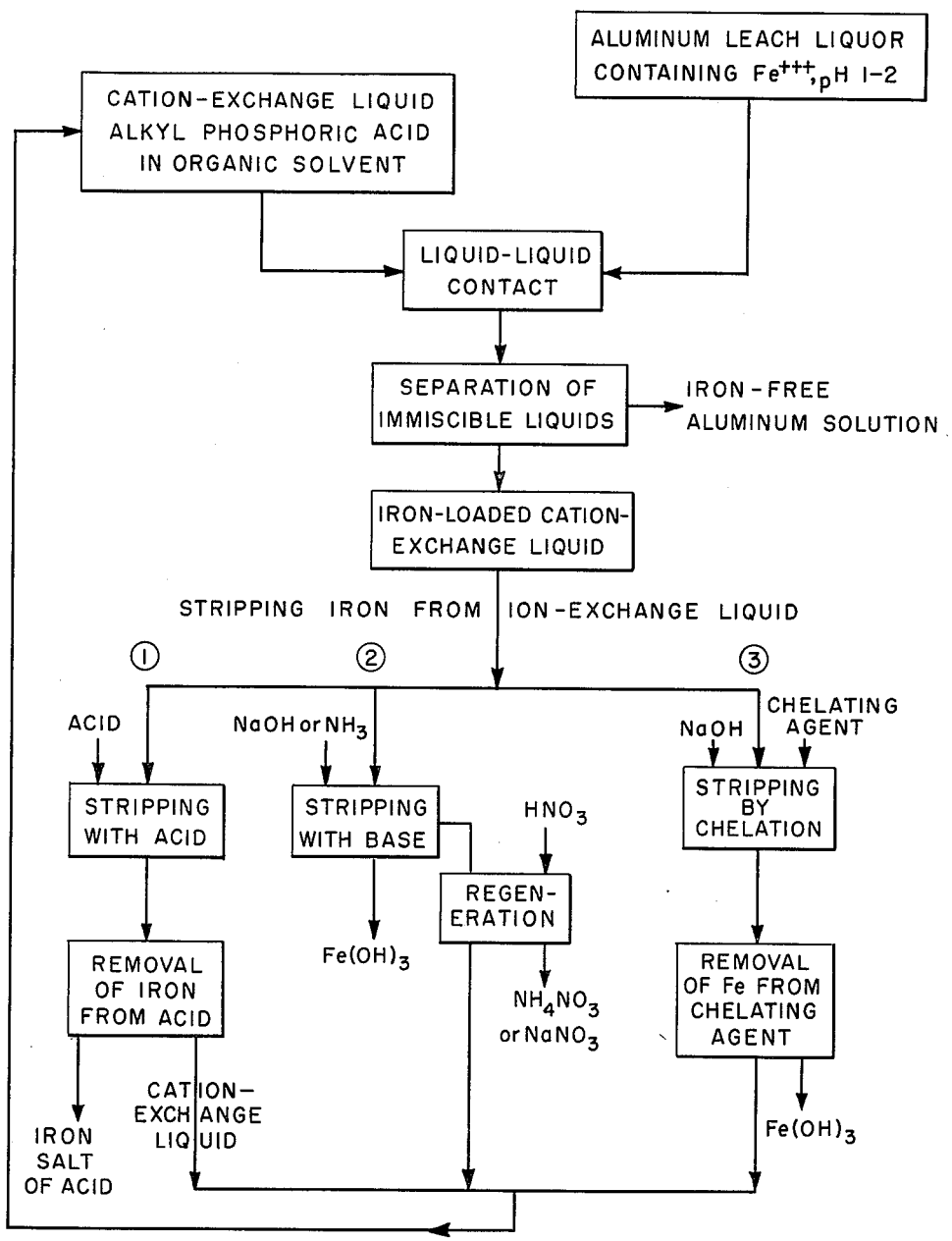
Fig. I
INVENTOR.
James H.B. George
BY  Ellery W. Stone
Attorney United States Patent Office 3,211,521
Patented Oct. 12, 1965

3,211,521
PROCESS FOR REMOVING IRON FROM ACIDIC ALUMINUM-CONTAINING SOLUTIONS
James H. B. George, Cambridge, and Ellery W. Stone, Brookline, Mass., assignors to Arthur D. Little, Inc., Cambridge, Mass., a corporation of Massachusetts
Filed July 30, 1962, Ser. No. 213,482
10 Claims. (Cl. 23—102)

This application is a continuation-in-part of our copending application Serial No. 183,083, filed March 28, 1962 and now abandoned.

This invention relates to a process for separating iron from aluminum and more particularly for separating traces of ferric iron from concentrated aluminum nitrate and aluminum sulfate solutions.

In metallurgical processes in which it is desirable to recover aluminum from ferruginous bearing ores, it is necessary to remove the iron values in a substantially quantitative manner to be able to produce $Al_2O_3$ sufficiently pure to be reduced to aluminum, for example by the Hall process. Aluminum may be successfully leached out of the ore after gross separation of the iron, but the resulting leach liquor, which is conveniently an aluminum nitrate or an aluminum sulfate solution, contains a residual quantity of iron which must be removed. Preferably the removal of the iron is achieved in such a manner as to make the iron available for recovery and also to employ an extractant for the iron which may be recovered and recycled in the process.

We have found that the iron values may be substantially quantitatively removed from an aluminum nitrate or aluminum sulfate leach liquor by the use of what will hereinafter be termed a liquid ion-exchange process in which an alkyl phosphoric acid is used as the liquid ion-exchange medium.

It is therefore a primary object of this invention to provide a process whereby iron may be quantitatively removed from an aluminum nitrate or aluminum sulfate leach liquor. It is another object to provide a process of the character described which is commercially economical and which permits the recovery of both the iron and the ion-exchange liquid, the latter being available for recycling in the process. It is another object to provide a process for removing iron from aluminum nitrate or aluminum sulfate leach liquors which, at the same time, removes only negligible quantities of aluminum. These and other objects will become apparent in the following description of this invention.

The invention accordingly comprises the several steps and the relation of one or more of such steps with respect to each of the others thereof, which will be exemplified in the process hereinafter disclosed, and the scope of the invention will be indicated in the claims.

The process of this invention will be further described with reference to FIG. 1 which is a flow diagram showing the steps of the process.

The use of a liquid cation-exchange reagent for separating heavy metals from process streams presents several attractive features. The first of these is the fact that most metals exist in solution as cations and can thus be extracted without preliminary addition of a complexing agent to the aqueous phase. Second, if the cation-exchange extractant is in the hydrogen form, then the output stream of the solvent extraction step will contain only hydrogen ions in addition to any deliberately non-extracted metals. Third, if the replaceable hydrogen of the extractant is weakly acidic, then the degree of loading and the selectivity for different metals can be controlled by adjusting the pH of the aqueous input stream. Furthermore, the use of liquid ion-exchange extraction systems, rather than ion-exchange resins, generally allows higher concentrations of metal values in process streams, thus reducing capital costs per pound of metal produced.

The method of this invention may be briefly defined as comprising the steps of contacting the acidic aluminum solution with an ion-exchange liquid which is a solution of alkyl phosphoric acid, separating the iron-free aluminum solution from the resulting iron-loaded ion-exchange liquid, stripping the iron from the ion-exchange liquid as an iron salt or hydroxide and recycling the ion-exchange liquid. Under these conditions only the ferric iron ($Fe^{+++}$) is extracted. However if ferrous iron ($Fe^{++}$) is present and its removal is desired, it may be readily converted to ferric by air oxidation and removed in the ferric state. Our method is illustrated in the form of a flow diagram in FIG. 1 and reference should be made to this drawing in the following detailed description. All steps are carried out at temperatures commensurate with the solvent system used.

It will be seen that the first step is the contacting of the cation-exchange extractant with the acid aluminum solution. This requires first the choice of a suitable extractant and then the choice of a solvent for the extractant in order to make the ion-exchange liquid.

In order to make the iron separation process commercially feasible the extractant should be one which is compatible with an inexpensive organic solvent and must, of course, also have a very low solubility in the aqueous phase. Moreover, since the aluminum nitrate or aluminum sulfate leach solution liquor from which the iron is to be removed by the process of this invention has an initial aqueous pH of about one, it is desirable that the extractant employed take out the iron at this pH or somewhat higher without removing any appreciable quantity of the aluminum. Finally, the extractant should be able to be loaded to a fairly high degree with the iron.

We have found that the alkyl-substituted phosphoric acids are ideally suited for extracting iron from an aluminum nitrate or aluminum sulfate leach liquor of the character described. The alkyl-substituted phosphoric acids may be either the mono- or di-substituted compounds having the general formula of $HRR'PO_4$ wherein R is a straight chain or branched chain alkyl radical containing at least 8 carbon atoms and R′ is hydrogen or an alkyl radical. Typical alkyl-substituted phosphoric acids suitable for iron extractants include, but are not limited to, monododecyl phosphoric acid, monoheptadecyl phosphoric acid, mono-octyl phosphoric acid, and dioctyl (or di-2-ethylhexyl) phosphoric acid. Of these, the last-named dioctyl phosphoric acid is preferred because it can be loaded with iron without picking up any appreciable quantity of aluminum, it is essentially insoluble in water and is capable of quantitatively removing iron at the pH normally encountered in the aluminum nitrate or sulfate leach liquids. It is, moreover, economical to use and may be recovered by several different methods discussed below.

In the process of this invention the extractant normally is dissolved in an organic solvent which is used as a carrier and which is essentially immiscible with water. This organic solvent carrier for the alkyl-substituted phosphoric acid extractant must be one which does not dissolve appreciably in water, nor react with the aluminum nitrate or aluminum sulfate leach liquor to be treated for iron removal, nor emulsify with the aqueous phase. Undesirable emulsification may be due either to the choice of the organic solvent carrier or to the choice of the extractant. Since it is, of course, desirable to prevent emulsification which materially complicates the separation of the aqueous and organic phases, combinations of extractants and solvent carriers must be chosen to prevent such emulsion formation. In some cases it may be desirable to add an anti-emulsifying agent to some cation-exchange liquids. It is, of course, also preferable that the organic solvent carrier is a relatively inexpensive and readily recoverable solvent to make the economics of the iron separation commercially feasible.

If temperatures are used which are high enough to sufficiently reduce the viscosity of the cation extractant, then the organic solvent may be omitted. In the following description it will be assumed, for simplicity of presentation, that the cation extractant is in solution.

Among the organic liquids which have been found to be suitable as a carrier solvent for the alkyl phosphoric acid extractant may be listed the aliphatic hydrocarbons, including kerosene and heptane, and aromatics such as xylene. A particularly suitable solvent is one which is essentially n-heptane and is sold as Skellysolve C by the Skelly Oil Corporation.

In making the cation-exchange liquid, it is preferable to make up solutions of the alkyl phosphoric acid in the organic solvent in concentrations from about 0.5 molar to about 2 molar, about one molar solutions being preferable. At concentration levels lower than about 0.5 molar the efficieny of extraction decreases below a practical limit and at concentration levels above about 2 molar the organic phase (cation-exchange liquid) becomes undesirably viscous at the lower temperatures of operation.

The resulting cation-exchange liquid (the alkyl-substituted phosphoric acid in solution) is then contacted with the aluminum nitrate or aluminum sulfate leach liquor containing the iron to be removed. This leach liquor generally has a pH of about 1 to 2 and at this acidity the iron is removed, while only negligible quantities of aluminum are extracted. Under these conditions the iron is bonded to the alkyl phosphoric acid by a reaction which may be postulated as follows for the nitrate system.

$$Fe^{+++}(a)+NO_3^-(a)+2HHR'PO_4 \rightleftharpoons FeNO_3(RR'PO_4)_2(o)+2H^+(a)$$

where $(a)$ and $(o)$ indicate the aqueous and organic phases, respectively. Apparently the nitrate oxyanion as well as the iron have a considerable affinity for the anion of the extractant, and the relatively high concentration of nitrate in the aluminum leach liquor tends to favor the forward direction of the reactant. A similar reaction may, of course, be written for the aluminum sulfate system.

At pH's lower than about 1 the efficiency of the iron extraction is greatly reduced while at pH's above about 2 the iron may precipitate as $Fe(OH)_3$ and some aluminum may be picked up. Therefore, it may be necessary to adjust the pH of the leach liquor prior to the contacting step to bring it within a range of from about 1 to 2.

By the mechanism described in the above equation, or one similar to it, the iron is thereby transferred from the aqueous to the nonaqueous, or organic, phase and the two liquid phases are then separated, the aqueous aluminum nitrate or sulfate phase, now iron-free, being available for further treatment as described in a co-pending application, Serial No. 44,471 filed on August 1, 1960, in the names of Richard W. Hyde and Stanley V. Margolin and assigned to the same assignee as this application. The iron contained in the organic phase is then stripped from the extractant to make the latter available for recycling.

The ratio of the volume of the aqueous phase leach liquor to the volume of cation-exchange liquid should range from about three to one to about ten to one. The volume of cation-exchange liquid used per unit volume of each liquid will, of course, depend strongly upon the amount of iron which is to be removed from the leach liquor, and upon the ability of the extractant to pick up the iron, that is the degree to which the extractant can be loaded with iron. For example in using a one molar (1 M) solution of dioctyl phosphoric acid in n-heptane, it has been found convenient to use approximately one volume of cation-exchange liquid for each four volumes of aluminum nitrate or aluminum sulfate leach liquid containing 5 grams of iron and 25 grams of aluminum (both as nitrates or sulfates) in one liter of solution. The examples given below will illustrate these parameters further.

The step of contacting the aqueous and organic phases may be accomplished by any manner known in the art for scrubbing a first liquid with a second immiscible liquid. Thus countercurrent scrubbing towers may be used and the contacting step is carried out or repeated until substantially all of the iron has been transferred from the aqueous phase to the organic phase. The number of extraction stages, e.g., number of actual contactings made between the leach liquor and cation-exchange liquid will depend upon the excess free acid present in the aqueous leach liquor, upon the amount of iron present, and upon the efficiency of transfer in the contact made between the two liquid phases. Other suitable extraction equipment which may be used include, but are not limited to, mixer-settlers and centrifugal extractors. Separation of the organic and aqueous phases may be accomplished by decantation or by the use of centrifugal separators, the latter method being generally the more efficient.

After the organic liquid containing the iron-loaded extractant has been separated from the aqueous phase, it is necessary to strip the iron from the extractant so that the cation-exchange liquid may be recycled. The step of stripping may be done by one of several methods; that is, by adding an acid to form the corresponding iron salt, by adding a base to form $Fe(OH)_3$, or by contacting the material with a chelating agent to form an iron complex. These are shown as alternatives 1, 2 and 3 in FIG. 1. In the case where stripping is accomplished by the addition of acid or by the use of a chelating agent, it is necessary to subsequently react the iron salt to recover the acid or to remove the iron cations from the chelating agent to recover it. Each of these methods of accomplishing the iron-stripping step will be discussed in detail below.

Since the alkyl phosphoric acid extract is a relatively weak acid cation exchanger, it is possible to remove metal ions from the organic phase by treatment with an aqueous solution of an acid. The use of an acid for stripping iron from the extractant depends upon the substitution of the hydrogen cation for iron, a reaction favored by the weak-acid character of the extractant. This acid method is the reversal of the mass action principle by which the iron was originally removed from the leach liquor. If the anion of the stripping acid also tends to form anionic aqueous complexes with the ferric ion, then the extent of stripping is increased further for a given concentration of acid.

Among the acids which are suitable for stripping the ferric iron from the cation-exchange liquids are those generally referred to as the strong mineral acids, namely hydrochloric acid, sulfuric acid, nitric acid and phosphoric acid. Of these, phosphoric acid is preferred. Nitric acid, acid stripping liquid to the iron-loaded extractant liquid were used. The data given below illustrate the ability of moderately concentrated phosphoric acid solutions to remove the iron from the extractants. An equilibration time of 20 minutes was used and the liquids were separated by centrifuging.

| Conc. of $H_3PO_4$ (molar) | Volume ratio of $H_3PO_4$ to extractant | Mole ratio of $H_3PO_4$ to Fe | Equilibrium Concentrations | |
|---|---|---|---|---|
| | | | Fe in $H_3PO_4$, g./l. | Fe in extractant, g./l. |
| 1.0 | 0.78 | 2.0 | 14.5 | 10.5 |
| 1.0 | 1.56 | 4.0 | 7.5 | 10.1 |
| 2.0 | 0.39 | 2.0 | 31.0 | 9.7 |
| 2.0 | 0.78 | 4.0 | 18.5 | 7.4 |

These data show that the extent of stripping in one stage varies from about 50% to 67% under these conditions and that the iron can be effectively removed from the extractant in several stages by the use of an acidic stripping agent.

Use of 7 N HCl in excess of the stoichiometric amount required was equally effective in removing the iron from the cation-exchange liquid.

*Example IV*

This example is directed to illustrating the stripping of the iron by a base from the iron-loaded cation-exchange liquid, as contrasted with the acid stripping of Example III.

As in the case of Example III a typical iron-loaded cation-exchange liquid was prepared by loading a 1 M solution of dioctyl phosphoric acid in n-heptane with 21.8 g. Fe/l. Various volumes of $NH_4OH$ solutions of several concentrations were then mixed with the iron-loaded liquid for three minutes and then the liquid phases were separated by centrifuging. In all cases the stripping of the iron was complete.

| Conc. of $NH_4OH$ Molar | Mole ratio of $NH_4OH$ to extractant |
|---|---|
| 15.0 | 15.0 |
| 12.0 | 12.0 |
| 9.0 | 9.0 |
| 6.0 | 6.0 |
| 3.0 | 3.0 |
| 15.0 | 3.0 |
| 9.0 | 1.8 |
| 6.0 | 1.2 |

These data illustrate not only the effectiveness of a weak base in stripping the iron from the extractant, but also the wide range of base concentrations and ratios of base to extractant which are useable.

Strong bases such as NaOH and KOH have been used with similar results.

Examples I–IV are directed to the removal of iron values from an aluminum nitrate leach liquor using the extractant in solution. Example V below illustrates the use of a solvent-free extractant—dioctyl phosphoric acid.

*Example V*

A leach liquor was used which contained ferric nitrate in a concentration of 1.5 g. Fe/l., aluminum nitrate in a concentration of 50 g. Al/l. and 0.3 N free $HNO_3$. Twenty-ml. samples of this leach liquor were then contacted with solvent-free dioctyl phosphoric acid by shaking the liquids. Separation of the two liquid phases was effected by centrifuging. The results are tabulated below in terms of concentration of ferric ion found in the leach liquor and the cation-exchange liquid after their separation.

| Liquid volume ratio Aqueous/Organic | $Fe^{+++}$ (g. Fe/l.) Aqueous nitrate solution | Found in Cation-exchange liquid |
|---|---|---|
| 2.5 | <0.001 | 3.75 |
| 5.0 | 0.025 | 7.50 |

These data indicate that the ferric ion is very efficiently removed using the solvent-free extractant.

The previous examples illustrated the removal of iron values from aluminum nitrate leach liquors. Example VI illustrates the removal of iron values from an aluminum sulfate leach liquor.

*Example VI*

A stock leach liquor was made up containing 29.4 g. Al/l. and 1.63 M sulfate ion. Various known amounts of ferric sulfate were added to separate portions of this stock leach liquor and the resulting samples were extracted for one hour with known volumes of 1 M solutions of dioctyl phosphoric acid in commercial grade n-heptane. In a second group of leach liquor samples, the sulfate ion concentration was reduced to one-half, i.e., to 0.82 M. After separation by centrifuging, the equilibrium aqueous phases and organic phases were analyzed for iron, the former by a ratio-tracer technique and the latter calculated from phase ratios. The data obtained are summarized below.

| Initial Concentrations | | | Equilibrium Concentrations | |
|---|---|---|---|---|
| $SO_4^=$ conc. (Molar) | Fe in leach liquor (Fe/l.) | Volume ratio of leach liquor to liquid extractant | Fe in leach liquor (Fe/l.) | Fe in liquid extractant (Fe/l.) |
| 1.63 | 0.525 | 1.0 | 0.005 | 0.520 |
| 1.63 | 0.525 | 2.5 | 0.004 | 1.30 |
| 1.63 | 0.525 | 5.0 | 0.018 | 2.35 |
| 1.63 | 0.525 | 10.0 | 0.018 | 5.07 |
| 1.63 | 0.525 | 20.0 | 0.105 | 8.40 |
| 1.63 | 2.63 | 10.0 | 0.540 | 20.90 |
| 0.82 | 1.32 | 2.5 | 0.023 | 3.25 |
| 0.82 | 1.32 | 5.0 | 0.139 | 5.90 |
| 0.82 | 1.32 | 10.0 | 0.274 | 10.50 |

In addition to illustrating the effectiveness of the liquid cationic extractant in removing iron from the aqueous leach liquor, the above data show that the sulfate concentrations exert no significant effects on the efficiency of the extractant.

It will be seen from the above description and examples that this invention provides an effective, economical and rapid process for removing iron from a strongly acidic solution containing aluminum in solution. This process is particularly well adapted to removing small amounts of iron from a highly acidic solution of aluminum nitrate or aluminum sulfate.

It will thus be seen that the objects set forth above, among those made apparent from the preceding description are efficiently attained and, since certain changes may be made in carrying out the above process without departing from the scope of the invention, it is intended that all matter contained in the above description shall be interpreted as illustrative and not in a limiting sense.

We claim:

1. A process for removing ferric iron from an acidic solution, comprising the steps of
    (a) contacting an acidic solution, having a pH between 1 and 2, of aluminum nitrate or aluminum sulfate in the form of an aqueous phase containing iron values in the form of ferric iron with a cation-exchange liquid extractant in the form of an organic phase thereby to form an iron complex of said extractant and to transfer said ferric iron from said although useable, is far less effective than the others. Where appropriate, mixtures of these acids may also be used. The use of hydrochloric acid stripping requires the recovery of the excess acid used which in turn requires an additional solvent extraction step with an amine extractant, for example, which removes the iron as a complex chloride anion.

The concentration of the acid stripping liquid and the volume ratios of stripping liquid to extractant liquid will vary from acid to acid and optimum combinations of concentrations, volume ratios, and the number of stripping stages can be readily determined for any system. The following may be cited as typical examples. In using aqueous phosphoric acid as a stripping liquid concentrations of from about 1 to 4 M are suitable; in using hydrochloric acid concentrations of from about 6 to 8 N are workable; and in using a mixture of sulfuric acid and hydrochloric acid concentrations of 3 N $H_2SO_4$ with 4 N HCl or 4 N $H_2SO_4$ with 3 N HCl are required. The relative volumes of acid stripping liquid to organic extractant liquid may vary from 1 to 2 to 2 to 1. The number of stages will be that which is required to remove substantially all of the iron from the cation-exchange liquid.

Stripping of the iron may also be accomplished by adding a base to the cation-exchange liquid to form ferric hydroxide. Sodium hydroxide and aqueous ammonia have been found to rapidly and effectively strip the iron from the extractant. From the standpoints of both cost and compatibility with the leach liquor, ammonium hydroxide is preferred. Stripping with a base is complete as well as rapid, because of the very low solubility of the resulting ferric hydroxide.

For the best results it is desirable that the amount of base used be at least equivalent to the amount of extractant used on a molar basis and for effective or quantitative precipitation of the iron an excess of the base is necessary. Concentrated solutions of the base additive are to be preferred, i.e., at least 1 N and it is desirable to use at least 40% excess to accomplish effective stripping. In the actual stripping step it is preferable to separate the precipitate of ferric hydroxide from the organic phase before filtration. Thus the step of stripping which employs a base reactant should include centrifuging of the liquid after the base has been added and then subsequently decanting the organic extractant containing liquid from the aqueous precipitate. The precipitate may then be filtered from the excess base which can be recycled while the precipitate may be further treated in any manner desired. Care must be taken to prevent emulsification during the addition of the basic reagent. This may be controlled by controlling the concentration of the reagent as well as the temperature, degree of agitation, and the choice of base.

The base-stripped extractant is in the form of $MRR'PO_4$ (where M is Na or $NH_3$) and can be applied directly to the leach liquor or first treated with nitric acid. If the extractant is used directly after stripping as $MRR'PO_4$ then ammonium nitrate is added to the leach liquor in an amount substantially equivalent to the iron removed.

Although stripping with a strong acid or base as described above is much to be preferred in recovering the cation-exchange liquid, other methods of removing the ferric iron may be used provided they accomplish such removal effectively and economically. The use of a chelating agent, such as tetrasoduim ethylenediaminetetraacetate, is indicated in FIG. 1. However, this has disadvantages which include the necessity for adding sodium hydroxide to separate the iron from the chelating agent, and some loss of the chelating agent to the organic phase.

The process of this invention will be further described in the following examples which are meant to be illustrative and not limiting.

Example I

A ferric nitrate solution was prepared to simulate the leach liquor from which the ferric iron was to be extracted. The ferric nitrate concentration in the solution was 4.95 g. Fe/l., the aluminum nitrate concentration was 25 g. Al/l. and the pH of the solution was 1.25. Twenty-ml. samples of this solution were then contacted with organic solutions of various alkyl-substituted phosphoric acids as the cation-exchange liquids. The cation-exchange liquids were made up as 1 M solutions and 10 ml. were shaken with the 20 ml. of ferric nitrate solution. Separation of the two liquid phases was by centrifuging. The results are tabulated below in terms of the concentrations of ferric ion found in the leach liquor and cation-exchange liquid after their separation subsequent to contacting them.

| Alkyl-substituted phosphoric acid | Organic solvent | $Fe^{+++}$ (g. Fe/l.) Aqueous nitrate solution | Found in Cation-exchange organic solution |
| --- | --- | --- | --- |
| Dioctyl | n-Heptane | 0.45 | 9.00 |
| Monododecyl | Kerosene | 2.03 | 5.84 |
| Monoheptadecyl | do | 1.13 | 7.64 |
| Commercial mixture of monooctyl and dioctyl. | n-Heptane | 0.05 | 9.80 |

These data illustrate the general class of alkyl-substituted phosphoric acids suitable as extractants in accordance with this invention.

Example II

A simulated leach liquor containing 0.34 M free $HNO_3$ and enriched to various initial concentrations of $Fe^{+++}$ was treated with various quantities of a 1 M dioctyl phosphoric acid in n-heptane as the cation-exchange liquid. An equilibrium time of one hour was used and the liquids were separated by centrifuging. The results are given below in terms of the equilibrium concentrations found in the aqueous phase corresponding to the leach liquor after treatment and in the organic phase corresponding to the iron-loaded extractant liquid.

| Initial Concentrations | | Equilibrium Concentrations | |
| --- | --- | --- | --- |
| Fe in simulated leach liquor (Fe/l.) | Volume ratio of leach liquor to liquid extractant | Fe in simulated leach liquor (Fe/l.) | Fe in liquid extractant (Fe/l.) |
| 2.84 | 1.0 | 0.0027 | 2.84 |
| 2.84 | 3.0 | 0.0054 | 8.50 |
| 2.84 | 5.0 | 0.0078 | 14.2 |
| 2.77 | 7.0 | 0.021 | 19.3 |
| 6.80 | 3.0 | 0.043 | 20.3 |
| 2.77 | 8.0 | 0.048 | 21.8 |
| 2.77 | 9.0 | 0.152 | 23.6 |
| 2.84 | 10.0 | 0.304 | 25.4 |
| 6.80 | 5.0 | 1.48 | 26.6 |
| 6.80 | 10.0 | 3.61 | 32.0 |

These data illustrate the effectiveness of the liquid extractant over a very wide range of original iron concentration. Moreover, even when the volume ratio of leach liquor to liquid extractant is very high (7–10) the amount of iron removed from the leach liquor is a very substantial percentage of that originally present. Further removal would, of course, be achieved by a second contacting of the leach liquor with more cation-exchange liquid.

Example III

This example is directed to illustrating the stripping of the iron by an acid from the iron-loaded cation-exchange liquid such as would result after the iron is removed from leach liquors in Examples I or II. Phosphoric acid was used as an acidic stripping agent. A 1 M solution of dioctyl phosphoric acid in heptane was loaded with 21.8 g. Fe/liter of solution. Various concentrations of phosphoric acid and various volume ratios of aqueous phase to said organic phase; said extractant being characterized as being an alkyl-substituted phosphoric acid having the formula HRR'PO$_4$ wherein R is alkyl containing at least 8 carbon atoms and R' is hydrogen or alkyl, being essentially insoluble in said aqueous phase, being capable of complexing with ferric ions in said acidic solution, and being essentially non-complexing with aluminum; the volume ratio of said aqueous phase to said cation-exchange liquid extractant ranging between about 3 to 1 and 10 to 1; and (b) separating said aqueous and organic phases.

2. A process in accordance with claim 1 wherein said extractant is dioctyl phosphoric acid.

3. A process in accordance with claim 1 wherein said alkyl-substituted phosphoric acid extractant is present in an organic solvent carrier, which is essentially immiscible with water and unreactive with said aluminum nitrate and aluminum sulfate, in a concentration between about 0.5 molar and about 2 molar.

4. A process in accordance with claim 3 wherein said organic solvent carrier is kerosene.

5. A process in accordance with claim 3 wherein said organic solvent carrier is n-heptane.

6. A process for removing ferric iron from an acidic solution, comprising the steps of
(a) contacting an acidic solution, having a pH between about 1 and 2, of aluminum nitrate or aluminum sulfate in the form of an aqueous phase containing iron values in the form of ferric iron with a cation-exchange liquid extractant in the form of an organic phase thereby to form an iron complex of said extractant and to transfer said ferric iron from said aqueous phase to said organic phase; said extractant being characterized as being an alkyl-substituted phosphoric acid having the formula HRR'PO$_4$ wherein R is alkyl containing at least 8 carbon atoms and R' is hydrogen or alkyl, being essentially insoluble in said aqueous phase, being capable of complexing with ferric ions in said acidic solution, and being essentially non-complexing with aluminum; said extractant being present in an organic solvent carrier, which is essentially immiscible with water and unreactive with said aluminum nitrate and aluminum sulfate, in a concentration between about 0.5 molar and about 2 molar; the volume ratio of said aqueous phase to said cation-exchange liquid extractant ranging between about 3 to 1 and 10 to 1;

(b) separating said aqueous and organic phases; and (c) stripping said iron values from said extractant and recycling the resulting stripped cation-exchange liquid in said contacting step (a).

7. A process in accordance with claim 6 wherein said stripping is accomplished by contacting said cation-exchange liquid containing said iron with an aqueous solution of a base which reacts with said iron complexed in said organic phase to form Fe(OH)$_3$; said solution of said base being at least one normal in concentration and used in an amount to provide at least the molar equivalent of said iron in said extractant.

8. A process in accordance with claim 7 wherein said base is NH$_4$OH.

9. A process in accordance with claim 6 wherein said stripping is accomplished by contacting said cation-exchange liquid containing said iron with a strong mineral acid capable of forming an iron salt.

10. A process in accordance with claim 9 wherein said strong mineral acid is aqueous H$_3$PO$_4$ of a concentration ranging between about 1 and 4 molar.

References Cited by the Examiner

UNITED STATES PATENTS

| | | | |
|---|---|---|---|
| 1,792,410 | 2/31 | Buchner | 23—102 |
| 2,847,275 | 8/58 | Yeager | 75—101 X |
| 2,847,279 | 8/58 | Tucker | 23—102 |
| 2,860,031 | 11/58 | Gunstest. | |
| 2,950,966 | 8/60 | Foos | 75—101 X |
| 3,055,754 | 9/62 | Fletcher | 75—97 |

FOREIGN PATENTS 469,061  7/37  Great Britain.

OTHER REFERENCES

Morrison et al.: "Solvent Extraction in Analytical Chemistry," John Wiley & Sons., Inc., New York, 1957, pp. 108, 127–130 and 137–142.

"New Organophosphorus Reagents Debut," Chemical and Engineering News, Sept. 19, 1960, pg. 57.

MAURICE A. BRINDISI, *Primary Examiner.*

DAVID L. RECK, *Examiner.*